(12) United States Patent
Chen

(10) Patent No.: US 12,493,143 B2
(45) Date of Patent: Dec. 9, 2025

(54) PRISM MODULE MANUFACTURING METHOD, PRISM MODULE AND PROJECTION DEVICE

(71) Applicant: Coretronic Corporation, Hsin-Chu (TW)

(72) Inventor: Fa-Chih Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 740 days.

(21) Appl. No.: 17/745,904

(22) Filed: May 17, 2022

(65) Prior Publication Data
US 2022/0373721 A1 Nov. 24, 2022

(30) Foreign Application Priority Data
May 21, 2021 (CN) .......................... 202110555394.7

(51) Int. Cl.
G03B 21/20 (2006.01)
G02B 5/00 (2006.01)
G02B 5/04 (2006.01)

(52) U.S. Cl.
CPC .............. *G02B 5/045* (2013.01); *G02B 5/003* (2013.01); *G03B 21/2066* (2013.01)

(58) Field of Classification Search
CPC ....... G03B 21/2066; G02B 5/045; G02B 5/04
See application file for complete search history.

(56) References Cited

U.S. PATENT DOCUMENTS

| | | | | |
|---|---|---|---|---|
| 6,560,048 | B1 * | 5/2003 | Okamori | G02B 27/283 348/E5.142 |
| 2012/0268720 | A1 * | 10/2012 | Wang | G03B 21/28 216/24 |

FOREIGN PATENT DOCUMENTS

| | | | |
|---|---|---|---|
| CN | 1983019 | A | 6/2007 |
| CN | 101382658 | A | 3/2009 |
| CN | 103364910 | A | 10/2013 |
| CN | 104166208 | A | 11/2014 |
| CN | 113795379 | A | 12/2021 |
| JP | 2012002873 | A | 1/2012 |
| TW | 201903853 | A | 1/2019 |
| WO | 2008059695 | A1 | 5/2008 |
| WO | 2020210072 | A1 | 10/2020 |

OTHER PUBLICATIONS

The Office Action, dated Mar. 13, 2025, in counterpart China Application No. 202110555394.7.

\* cited by examiner

*Primary Examiner* — Ryan D Howard

(57) ABSTRACT

A prism module manufacturing method includes the following steps of: adjusting a first prism and a second prism to have a predetermined temperature difference; using an adhesive layer to be partially connected between the first prism and the second prism so that there is a gap between the first prism and the second prism, wherein the adhesive layer includes a glue material and a plurality of spacers arranged in the glue material. The invention further provides a prism module and a projection device having the prism module. The prism module and the manufacturing method thereof of the invention avoid the interference problem in the prism module so that the image quality and reliability of the projection device can be improved.

17 Claims, 4 Drawing Sheets

```
┌────────────────────────────────────────────────┐
│ adjusting a first prism and a second prism to  │
│ have a predetermined temperature difference    │── S1
└────────────────────────────────────────────────┘
                      ↓
┌────────────────────────────────────────────────┐
│ using an adhesive layer to be partially        │
│ connected between the first prism and the      │
│ second prism so that there is a gap between    │── S2
│ the first prism and the second prism           │
└────────────────────────────────────────────────┘
                      ↓
┌────────────────────────────────────────────────┐
│ returning the first prism and the second       │
│ prism to an ambient temperature                │── S3
└────────────────────────────────────────────────┘
```

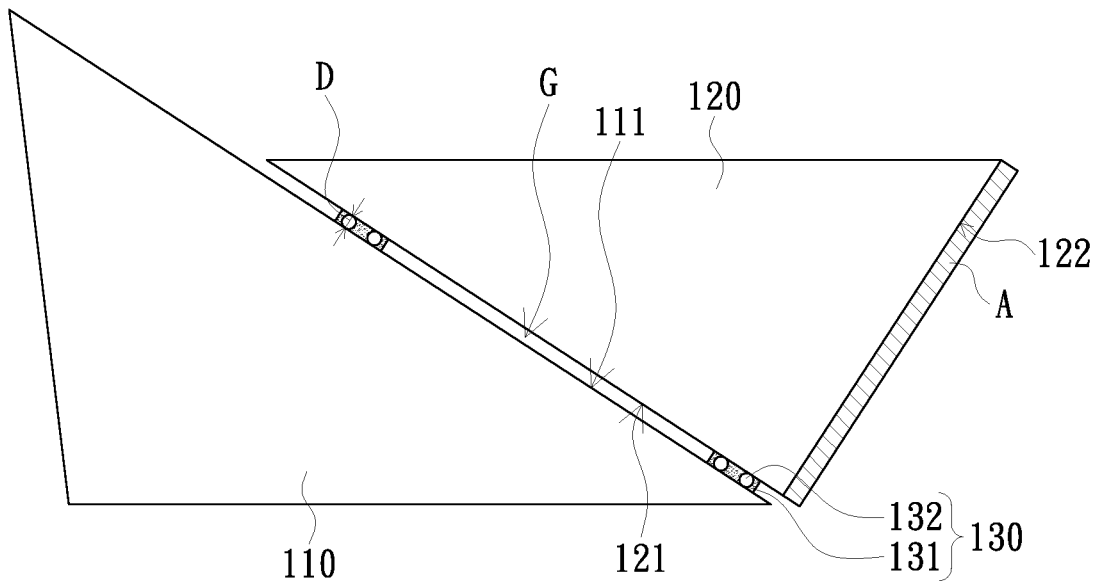

FIG. 1

```
┌─────────────────────────────────────────────────┐
│ adjusting a first prism and a second prism to   │ ─── S1
│      have a predetermined temperature           │
│                difference                       │
└─────────────────────────────────────────────────┘
                        ↓
┌─────────────────────────────────────────────────┐
│ using an adhesive layer to be partially         │
│ connected between the first prism and the       │ ─── S2
│ second prism so that there is a gap between     │
│      the first prism and the second prism       │
└─────────────────────────────────────────────────┘
                        ↓
┌─────────────────────────────────────────────────┐
│ returning the first prism and the second prism  │ ─── S3
│           to an ambient temperature             │
└─────────────────────────────────────────────────┘
```

FIG. 2

PRISM MODULE MANUFACTURING METHOD, PRISM MODULE AND PROJECTION DEVICE

CROSS-REFERENCE TO RELATED APPLICATION

This application claims the priority benefit of China application (202110555394.7), filed on May 21, 2021. The entirety of the above-mentioned patent application is hereby incorporated by reference herein and made a part of this specification.

FIELD OF THE INVENTION

The invention relates to an optical element and a manufacturing method thereof, and more particular to a prism module, a manufacturing method thereof, and a projection device having the prism module.

BACKGROUND OF THE INVENTION

A projection device mainly includes an illuminating system, a light valve, and a projection lens. The illuminating system is configured to provide an illumination beam. The light valve is configured to convert the illumination beam into an image beam. The projection lens is configured to project the image beam onto a screen to produce an image on the screen.

In the prior art, some of the projection devices are provided with a prism module among the illumination system, the light valve and the projection lens so that the illumination beam generated by the illumination system is reflected to the light valve, and then the image beam generated by the light valve can pass through the prism module and is transmitted to the projection lens. The prism module is mainly composed of a first prism and a second prism adhered by an adhesive layer, and there is an air gap between the first prism and the second prism. However, during an operation period of a projection device using this type of prism module, the image beam is likely to change the interference in the prism module due to the change of the air gap, which causes the quality of the image projected by the projection device to deteriorate.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a prism module manufacturing method to avoid the interference problem in the prism module.

The invention provides a prism module to avoid the interference problem.

The invention provides a projection device to provide an improved image quality.

Other purposes and advantages of the invention can be further understood from the technical features disclosed in the invention.

In order to achieve one or part or all of the above purposes or other purposes, the prism module manufacturing method provided by the invention includes the following steps: adjusting a first prism and a second prism to have a predetermined temperature difference; using an adhesive layer to be partially connected between the first prism and the second prism so that there is a gap between the first prism and the second prism. The adhesive layer includes a glue material and a plurality of spacers arranged in the glue material.

In order to achieve one or part or all of the above purposes or other purposes, the prism module provided by the invention includes a first prism, a second prism and an adhesive layer. The first prism has a first surface. The second prism has a second surface opposite to the first surface. The adhesive layer is partially connected between the first surface and the second surface so that there is a gap between the first surface and the second surface, wherein the adhesive layer includes a glue material and a plurality of spacers arranged in the glue material.

In order to achieve one or part or all of the above purposes or other purposes, the projection device provided by the invention includes an illumination system, a light valve, a projection lens, and the aforementioned prism module. The illumination system is configured to provide illumination beams. The light valve is located on a transmission path of the illumination beam, and the light valve is configured to convert the illumination beam into an image beam. The projection lens is located on a transmission path of the image beam, and the projection lens is configured to project the image beam. The prism module is arranged among the illumination system, the light valve and the projection lens. The first surface of the first prism of the prism module can reflect the illumination beam to the light valve, and the image beam passes through the first surface and the second surface and is transmitted to the projection lens.

In the prism module and the manufacturing method thereof of the invention, because an adhesive layer with spacers is used, the gap between the first prism and the second prism can be easily kept consistent, thereby avoiding the interference problem in the prism module. In addition, the projection device of the invention uses the prism module, so the projection device can have improved image quality.

In order to make the above and other purposes, features and advantages of the invention easier to understand, preferred embodiments is described in detail below in conjunction with the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic diagram of a prism module according to an embodiment of the invention;

FIG. 2 is a flowchart of a prism module manufacturing method according to an embodiment of the invention;

DETAILED DESCRIPTION OF PREFERRED EMBODIMENTS

The foregoing and other technical content, features and effects of the invention will be clearly presented in the following detailed description of preferred embodiments with reference to the drawings. The directional terminology mentioned in the following embodiments, such as "top", "bottom", "front", "back", etc., is used with reference to the orientation of the Figure(s) being described. As such, the directional terminology is used for purposes of illustration and is in no way limiting.

In order to reduce the interference variation produced by the prism module, the inventor(s) of the invention has conducted in-depth research and found that the interference variation is related to the change in the distance between the first prism and the second prism of the prism module. Furthermore, the temperatures of the first prism and the second prism rise when in the operation state. The above-mentioned temperature is higher than the manufacturing temperature of the prism module, and the inconsistency of temperatures generates stress and therefore causing the image to have fringes. In addition, the temperature difference between the first prism and the second prism causes the two prisms to have different degrees of the expansion, the difference causes the distance between the first prism and the second prism inconsistent. The invention provides an improvement plan for this problem and will describe it in detail below. In addition, the operation state is defined as when the projection device is activated and when the beam irradiates the prism module.

Figure 7:
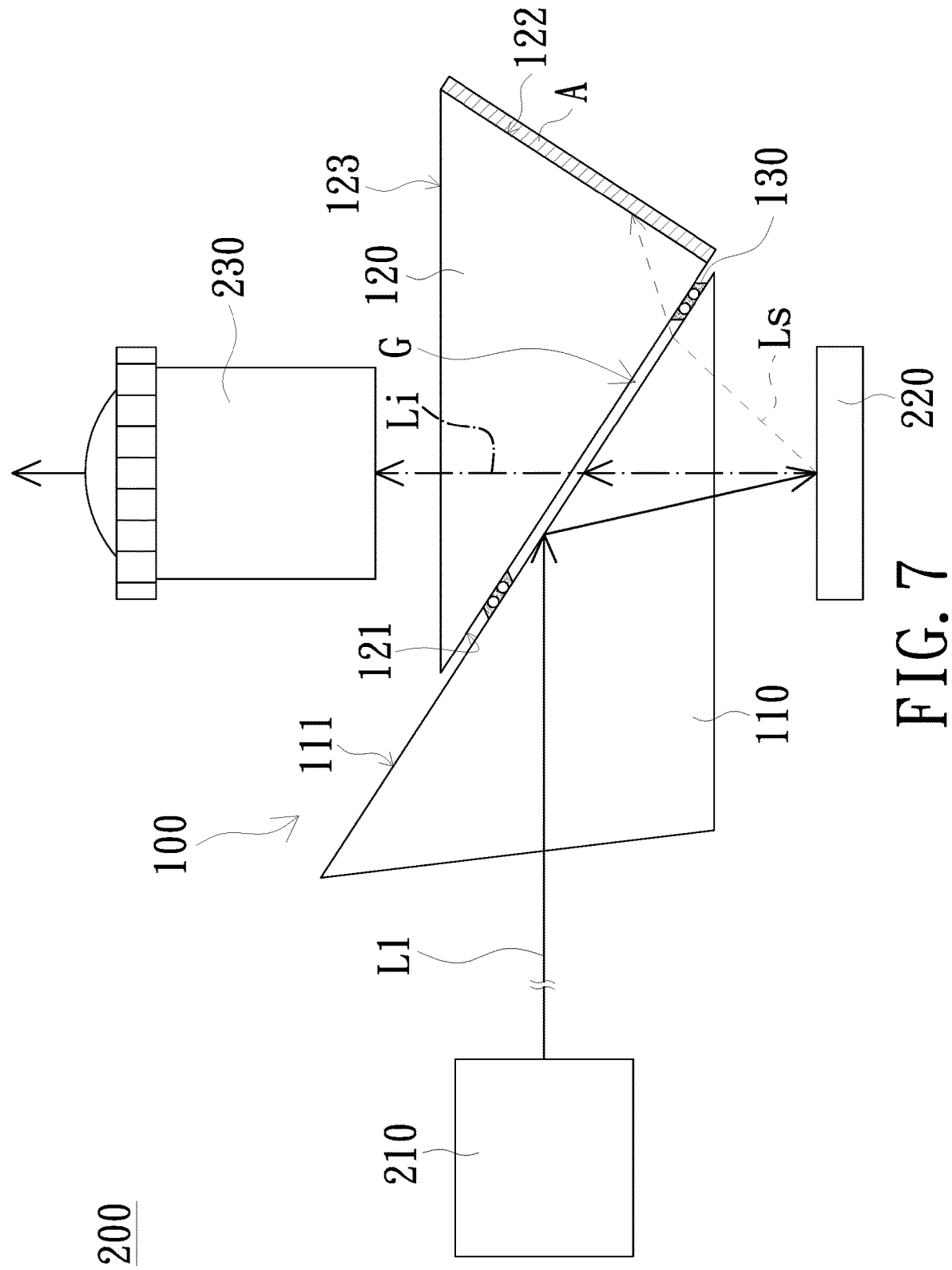
FIG. 7 is a schematic diagram of a projection device using the prism module of FIG. 1 according to an embodiment of the invention.

FIG. 1 is a schematic diagram of a prism module according to an embodiment of the invention. FIG. 7 is a schematic diagram of a projection device using the prism module of FIG. 1 according to an embodiment of the invention. Please refer to FIGS. 1 and 7. The prism module 100 can be used in a projection device and includes a first prism 110, a second prism 120 and an adhesive layer 130. The first prism 110 has a first surface 111. The second prism 120 has a second surface 121 opposite to the first surface 111. The adhesive layer 130 is partially connected between the first surface 111 and the second surface 121 so that there is a gap G between the first surface 111 and the second surface 121. The adhesive layer 130 includes a glue material 131 and a plurality of spacers 132 arranged in the glue material 131. There is air in the gap G.

The first prism 110 and the second prism 120 are, for example, triangular prisms, the first surface 111 may be a rectangular surface of the first prism 110, and the second surface 121 may be a rectangular surface of the second prism 120. In addition, the second prism 120 of this embodiment may further have a third surface 122 adjacent to the second surface 121, and the third surface 122 is provided with a light-absorbing layer A. The light-absorbing layer A is configured to absorb the stray beam generated by the light valve of the projection device. Therefore, the temperature of the second prism 120 will be higher than the temperature of the first prism 110 when the projection device is in an operation state. The light-absorbing layer A includes, for example, a black-coated layer (not shown), but the embodiment is not limited thereto. In addition, the third surface 122 may be a rectangular surface of the second prism 120, but the embodiment is not limited thereto. According to another embodiment of the invention, the first surface 111, the second surface 121, and the third surface 122 may be, for example, polished surfaces. According to still another embodiment of the invention, the first surface 111, the second surface 121, and the third surface 122 may include, for example, an optical film, such as an anti-reflection film.

The spacers 132 are arranged between the first surface 111 and the second surface 121 so that the gap G between the first surface 111 and the second surface 121 can maintain a uniform distance. The relationship between the spacers 132 and the adhesive layer 130 will be further described in the following. The supporting force of the adhesive layer 130 will be insufficient if the volume ratio of the spacers 132 to the adhesive layer 130 is too small. On the contrary, the adhesive force of the adhesive layer 130 will be insufficient if the volume ratio of the spacers 132 to the adhesive layer 130 is too large. Therefore, the spacers 132 of the present embodiment may account for about 0.7% to 11.3% of the volume of the adhesive layer 130, so as to take into account the support strength and the adhesive strength of the adhesive layer 130. The shape of the spacer 132 is, for example, a granular shape, and the diameter D of each spacer 132 is, for example, between 3.5-12.0 μm, but the invention is not limited thereto. In addition, the material of the spacer 132 may include silicon dioxide, high molecular polymer, metal, or a combination thereof, but the invention is not limited thereto. Incidentally, in this embodiment, the glue material 131 of the adhesive layer 130 may include ultraviolet curing glue (UV glue), thermosetting glue, or thermosetting ultraviolet curing glue (thermosetting UV glue), but other embodiments are not limited to this. The minimum width of the gap G between the first surface 111 and the second surface 121 is equal to the diameter D of the spacer 132, for example, between 3.5-12.0 μm.

The prism module 100 of this embodiment adopts the adhesive layer 130 with the spacers 132. Thus, even if the first prism 110 and the second prism 120 have different degrees of expansion due to having different temperatures when the projection device is in the operation state, the gap G between the first surface 111 and the second surface 121 can still maintain the same width without causing the variation of air gap, so the interference problem can be avoided.

In addition, the inventor(s) of the invention also found that stress is generated by the different degrees of thermal expansion between the first prism 110 and the second prism 120, and the stress may cause the first prism 110 and the second prism 120 to break. Moreover, the adhesive force of the adhesive layer 130 will decrease when the adhesive layer 130 is in a high temperature state. Therefore, when the adhesive layer 130 are pulled by the first prism 110 and the second prism 120 due to the different degrees of expansion, the first prism 110 and the second prism 120 are at risk of being separated from each other. In regard to this problem, the invention also provides a prism module manufacturing method.

Figure 3:
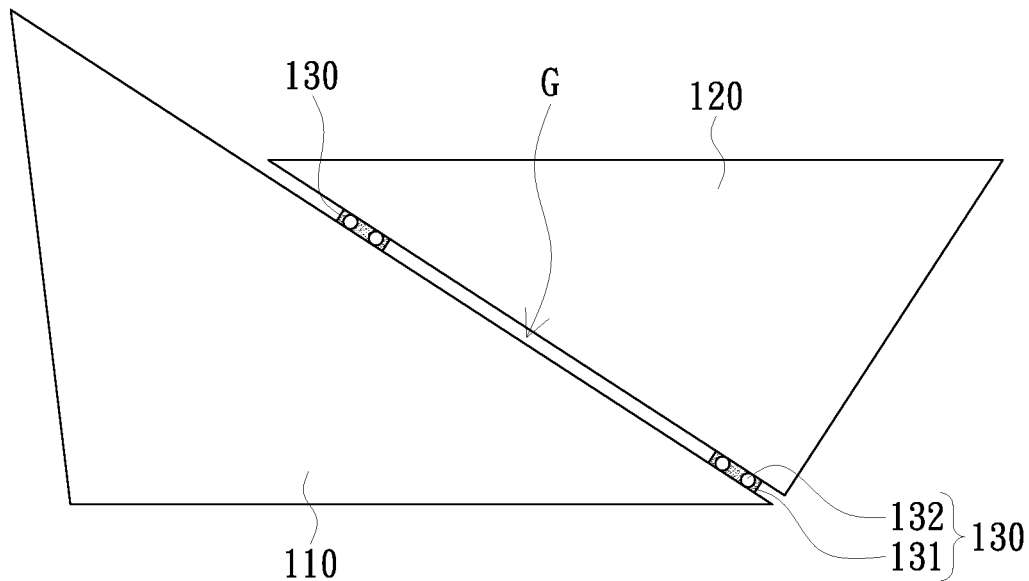
FIG. 3 is a schematic diagram for illustrating the step S2 in FIG. 2.

FIG. 2 is a flowchart of a prism module manufacturing method according to an embodiment of the invention. FIG. 3 is a schematic diagram for illustrating the step S2 in FIG. 2. Please refer to FIGS. 2 and 3. The prism module manufacturing method includes the following steps. Step S1: adjusting a first prism 110 and a second prism 120 to have a predetermined temperature difference. In detail, the temperature of the second prism 120 is adjusted to be higher than the temperature of the first prism 110. Furthermore, the step S1 can be completed by heating the second prism 120 and/or cooling the first prism 110, wherein the aforementioned heating treatment can be performed by an oven, but the embodiment is not limited thereto. The aforementioned predetermined temperature difference may be determined by the temperature difference between the first prism 110 and the second prism 120 in the operation state, and the predetermined temperature difference in this embodiment is, for example, between 2° C. to 80° C., but other embodiments are not limited thereto. According to another embodiment of the invention, the aforementioned predetermined temperature difference is preferably equal to the temperature difference between the first prism 110 and the second prism 120 in the operation state.

Next, step S2: using an adhesive layer 130 to be partially connected between the first prism 110 and the second prism 120 so that there is a gap G between the first prism 110 and the second prism 120. In detail, the adhesive layer 130 includes a glue material 131 and a plurality of spacers 132 arranged in the glue material 131. The specific setting position of the adhesive layer 130 can be adjusted according to the light transmission path, and the invention is not limited to the position shown in the figures, wherein the position of the adhesive layer 130 does not block the transmission path of the beam.

In the step S2, the adhesive layer 130 is adhered to the first prism 110 and the second prism 120 in the situation that the first prism 110 and the second prism 120 have a predetermined temperature difference. Therefore, the adhesive layer 130 is not easily pulled by the first prism 110 and the second prism 120 when the first prism 110 and the second prism 120 have a temperature difference, and the first prism 110 and the second prism 120 are not at risk of rupture caused by the stress. In this way, the problem of the prism rupture caused by the stress generated by the temperature difference between the first prism 110 and the second prism 120 in the operation state can be solved. When the prism module 100a manufactured by the prism module manufacturing method of this embodiment is in the operation state, the stress received by the adhesive layer 130 can be less than 2200 kPa, or even less than 1100 kPa, so the problem of mutual separation of the first prism 110 and the second prism 120 can be avoided.

Figure 4:
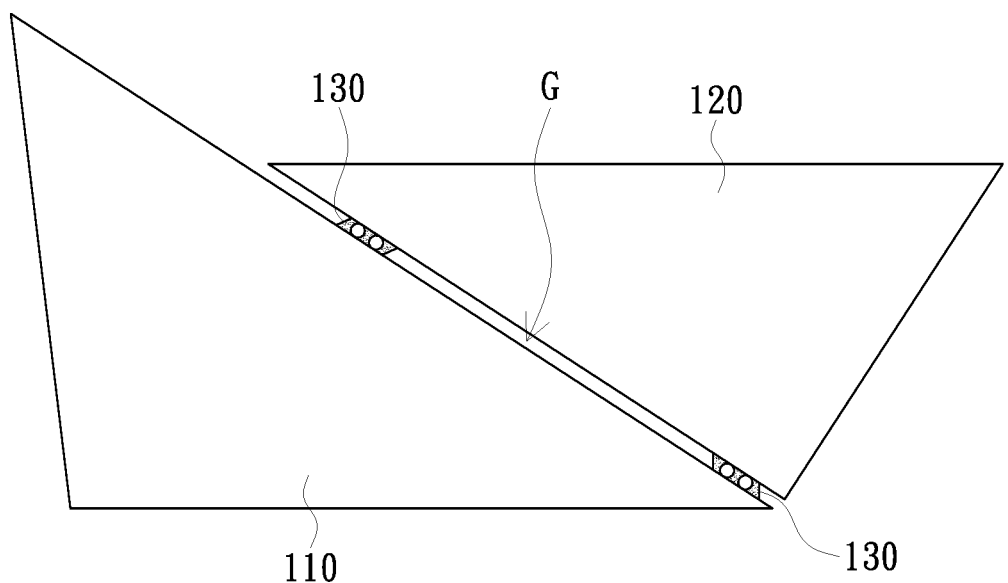
FIG. 4 is a schematic diagram for illustrating the step S3 in FIG. 2.
Figure 5:
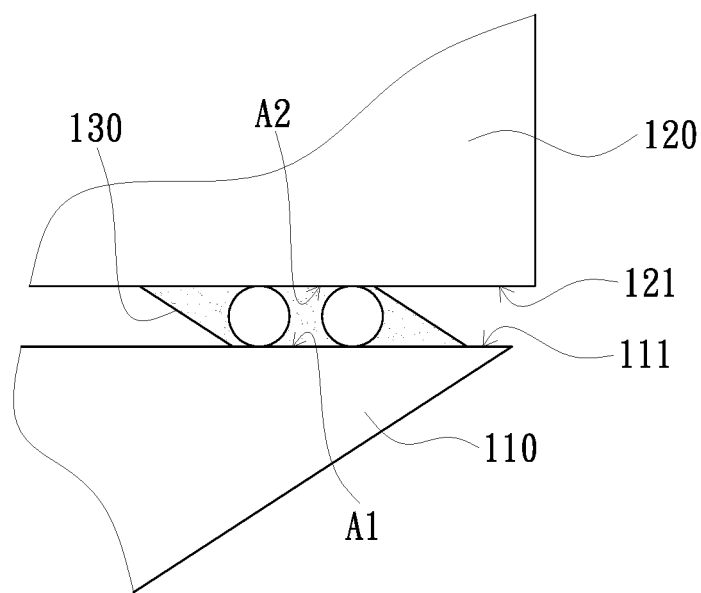
FIG. 5 is a schematic enlarged diagram of the adhesive layer in FIG. 4.

FIG. 4 is a schematic diagram for illustrating the step S3 in FIG. 2. FIG. 5 is a schematic enlarged diagram of the adhesive layer in FIG. 4. Please refer to FIGS. 2, 4 and 5. After the step S2, the prism module manufacturing method may further include the step S3: returning the first prism 110 and the second prism 120 to an ambient temperature. The ambient temperature is lower than the temperature when the prism module 100a is in the operation state. For example, the ambient temperature is about 20° C., and the temperature in the operation state may be between 60° C. and 150° C. If the second prism 120 is heated in the step S1, the second prism 120 shrinks due to the temperature drop in the step of returning to the ambient temperature. If the first prism 110 is cooled in the step S1, the first prism 110 expands due to the increase in temperature in the step of returning to the ambient temperature. Therefore, in the step S3, the adhesion layer 130 is pulled and deformed due to the expansion of the first prism 110 and/or the contraction of the second prism 120. For example, the shape of the adhesion layer 130 shown in FIG. 4 is caused by the contraction of the second prism 120. However, because the ambient temperature is lower than the temperature in the operation state, the adhesive layer 130 at the ambient temperature has better adhesive force than the adhesive layer 130 at the temperature in the operation state. That is, even though the adhesive layer 130 tilts due to the stress as shown in FIG. 5, the risk of mutual separation of the first prism 110 and the second prism 120 will not happen.

Figure 6:
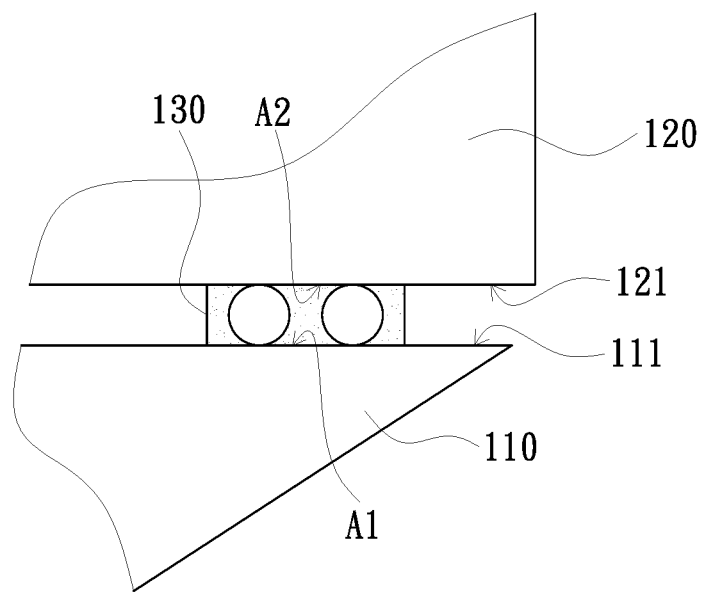
FIG. 6 is an enlarged schematic diagram of an adhesive layer of FIG. 3.

Please refer to FIGS. 2 and 5. The adhesive layer 130 shown in FIG. 5 may have a first adhesive surface A1 and a second adhesive surface A2, wherein the first adhesive surface A1 contacts the first surface 111, and the second adhesive surface A2 contacts the second surface 121. The overlapping ratios of the first adhesive surface A1 and the second adhesive surface A2 in the steps S2 and S3 of FIG. 2 are different. The overlapping ratio is defined as the ratio of the overlapping area of the first adhesive surface A1 and the second adhesive surface A2 of the adhesive layer 130 along the normal direction of the first surface 111 of the first prism 110. Specifically, in the step S3, the adhesive layer 130 is pulled and deformed due to the expansion of the first prism 110 and/or the contraction of the second prism 120, and the overlapping ratio between the first adhesive surface A1 and the second adhesive surface A2 is P1 at this time. In addition, please refer to FIGS. 2 and 6. In the step S2 of FIG. 2, the adhesive layer 130 is not pulled by the first prism 110 and the second prism 120, and the overlapping ratio between the first adhesive surface A1 and the second adhesive surface A2 is P2 at this time, wherein P2 is greater than P1. The difference between P2 and P1 is, for example, about 0.1%, but other embodiments are not limited thereto. In addition, the degree of deformation of the adhesive layer 130 caused by being pulled due to the temperature difference between the first prism 110 and the second prism 120 in the operation state is less than the degree of deformation in the step of returning to the ambient temperature. Therefore, the overlapping ratio between the first adhesive surface A1 and the second adhesive surface A2 is also greater than P1 so that the first prism 110 and the second prism 120 can effectively avoid the interference problem.

FIG. 7 is a schematic diagram of a projection device according to an embodiment of the invention. Please refer to FIG. 7. The projection device 200 includes an illumination system 210, a light valve 220, a projection lens 230, and the aforementioned prism module 100, wherein the prism module 100 can be replaced by the aforementioned prism module 100a (shown in FIGS. 3 and 4). The illumination system 210 is configured to provide an illumination beam L1. The light valve 220 is located on the transmission path of the illumination beam L1, and the light valve 220 is configured to convert the illumination beam L1 into an image beam Li. The projection lens 230 is located on the transmission path of the image beam Li, and the projection lens 230 is configured to project the image beam Li away from the projection device 200. The prism module 100 is disposed among the illumination system 210, the light valve 220 and the projection lens 230. The first surface 111 of the first prism 110 of the prism module 100 can reflect the illumination beam L1 to the light valve 220, and the image beam Li passes through the first surface 111 and the second surface 121 and is transmitted to the projection lens 230. In addition, the prism module 100 is located on the transmission path of the image beam Li and disposed between the light valve 220 and the projection lens 230.

The illumination system 210 may include a light source (not shown). The aforementioned light source may include an ultra-high pressure mercury lamp (UHP lamp), a xenon lamp, a light emitting diode (LED) or a laser diode (LD). Furthermore, the number of the aforementioned ultra-high pressure mercury lamp and xenon lamp is, for example, one. On the other hand, the number of the aforementioned light-emitting diodes or laser diodes can be one or more. For example, the light emitting diodes (or laser diodes) may be arranged in a matrix when the number of the light emitting diodes (or laser diodes) is plural. In addition, in an embodiment where the light source includes a light emitting diode or a laser diode, the illumination system 210 may further include a wavelength conversion element (for example, a phosphor wheel). The wavelength conversion element can receive the excitation beam provided by the laser diode, and convert the excitation beam into a colored light with a different wavelength from the excitation beam, so as to further constitute an image picture.

The light valve 220 of this embodiment is, for example, a digital micromirror device (DMD) to generate an image beam Li and an off-state beam Ls (that is, the stray beam in the foregoing). In detail, the image beam Li may first enter the first prism 110, and passes through the first surface 111 and the second surface 121, and then is emitted from the fourth surface 123 of the second prism 120 to the projection lens 230. On the other hand, the off-state beam Ls can emit to the light absorption layer A of the third surface 122 of the second prism 120. Incidentally, the position of the adhesive layer 130 of the prism module 100 can be staggered with light to prevent the adhesive layer 130 from cracking due to the excessive temperature. In other embodiments, the light valve 220 may be a liquid crystal on silicon (LCoS) or a liquid crystal display (LCD). In addition, this embodiment does not limit the number of light valves 220. For example, other embodiments may use a single-chip liquid crystal display panel or a three-chip liquid crystal display panel structure, but the invention is not limited to this. In addition, the transmission path of the image beam Li and the off-state beam Ls also vary according to different types of the light valve 220.

The projection lens 230 includes, for example, one or more optical lenses, and the diopter of the optical lenses may be the same or different from each other. For example, the optical lens may include various non-planar lenses such as biconcave lenses, biconvex lenses, concavo-convex lenses, convexo-concave lens, plano-convex lenses, and plano-concave lenses, or any combination of the aforementioned non-planar lenses. On the other hand, the projection lens 230 may also include a flat optical lens. The invention does not limit the specific structure of the projection lens 230.

Because the adopted prism module 100 or 100a can effectively avoid the interference problem, the projection device of this embodiment has improved image quality.

In summary, the invention has at least the following advantages:

1. In the prism module and the manufacturing method thereof of the invention, because an adhesive layer with spacers is used, the gap between the first prism and the second prism can be easily kept consistent to avoid the interference problem in the prism module, thereby improving the image quality of the projection device of the invention.

2. In the prism module manufacturing method of the invention, the first prism and the second prism are adhered with the adhesive layer when the first prism and the second prism have a predetermined temperature difference, which can prevent the risk of rupture or mutual separation of the first prism and the second prism in the operation state so that the reliability of the projection device of the invention can be improved.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first prism, the second prism, the first surface, the second surface and the third surface are only used for distinguishing various elements and do not limit the number of the elements.

What is claimed is:

1. A prism module manufacturing method, comprising steps of:
   adjusting a first prism and a second prism to have a predetermined temperature difference; and
   using an adhesive layer to be partially connected between the first prism and the second prism so that there is a gap between the first prism and the second prism, wherein the adhesive layer comprises a glue material and a plurality of spacers arranged in the glue material.

2. The prism module manufacturing method according to claim 1, wherein the step of adjusting the first prism and the second prism to have the predetermined temperature difference comprises a step of:
   heating the second prism and/or cooling the first prism.

3. The prism module manufacturing method according to claim 2, wherein the first prism has a first surface, the second prism has a second surface opposite to the first surface, the adhesive layer is partially connected between the first surface and the second surface, the second prism further has a third surface adjacent to the second surface, and the third surface is provided with a light-absorbing layer.

4. The prism module manufacturing method according to claim 1, wherein the predetermined temperature difference is between 2° C. and 80° C.

5. The prism module manufacturing method according to claim 1, wherein after the step of using the adhesive layer to be partially connected between the first prism and the second prism, the prism module manufacturing method further comprises a step of:
returning the first prism and the second prism to an ambient temperature.

6. The prism module manufacturing method according to claim 1, wherein the glue material comprises UV glue, thermosetting glue or thermosetting UV glue.

7. The prism module manufacturing method according to claim 1, wherein the plurality of spacers account for 0.7% to 11.3% of a volume of the adhesive layer.

8. The prism module manufacturing method according to claim 1, wherein a material of the plurality of spacers comprises silicon dioxide, high molecular polymer, metal or a combination thereof.

9. The prism module manufacturing method according to claim 1, wherein each of the plurality of spacers has a diameter between 3.5 µm to 12.0 µm.

10. A prism module, comprising a first prism, a second prism and an adhesive layer, wherein:
the first prism has a first surface;
the second prism has a second surface opposite to the first surface; and
the adhesive layer is partially connected between the first surface and the second surface so that there is a gap between the first surface and the second surface, wherein the adhesive layer comprises a glue material and a plurality of spacers arranged in the glue material;
wherein the adhesive layer has a first adhesive surface and a second adhesive surface, the first adhesive surface contacts the first surface and the second adhesive surface contacts the second surface, wherein when there is no temperature difference between the first prism and the second prism, an overlapping ratio between the first adhesive surface and the second adhesive surface is P1, wherein when there is a temperature difference between the first prism and the second prism, the overlapping ratio between the first adhesive surface and the second adhesive surface is P2, wherein P2 is greater than P1.

11. The prism module according to claim 10, wherein when the prism module is applied to a projection device and in an operation state, a stress received by the adhesive layer is less than 1100 kPa.

12. The prism module according to claim 10, wherein a material of the plurality of spacers comprises silicon dioxide, high molecular polymer, metal or a combination thereof.

13. The prism module according to claim 10, wherein the plurality of spacers account for 0.7% to 11.3% of a volume of the adhesive layer.

14. The prism module according to claim 10, wherein each of the plurality of spacers has a diameter between 3.5 µm to 12.0 µm.

15. The prism module according to claim 10, wherein the second prism further has a third surface adjacent to the second surface, and the third surface is provided with a light-absorbing layer.

16. A prism module, comprising a first prism, a second prism and an adhesive layer, wherein:
the first prism has a first surface;
the second prism has a second surface opposite to the first surface; and
the adhesive layer is partially connected between the first surface and the second surface so that there is a gap between the first surface and the second surface, wherein the adhesive layer comprises a glue material and a plurality of spacers arranged in the glue material;
wherein when the prism module is applied to a projection device and in an operation state, a stress received by the adhesive layer is less than 2200 kPa.

17. A projection device, comprising an illumination system, a light valve, a projection lens, and a prism module, wherein the illumination system is configured to provide an illumination beam, the light valve is located on a transmission path of the illumination beam, the light valve is configured to convert the illumination beam into an image beam, the projection lens is located on a transmission path of the image beam, the projection lens is configured to project the image beam, the prism module is disposed among the illumination system, the light valve and the projection lens, and the prism module comprises a first prism, a second prism and an adhesive layer, wherein:
the first prism has a first surface;
the second prism has a second surface opposite to the first surface; and
the adhesive layer is partially connected between the first surface and the second surface so that there is a gap between the first surface and the second surface, wherein the adhesive layer comprises a glue material and a plurality of spacers arranged in the glue material;
wherein the first surface is configured to reflect the illumination beam to the light valve, and the image beam passes through the first surface and the second surface and is transmitted to the projection lens;
wherein the adhesive layer has a first adhesive surface and a second adhesive surface, the first adhesive surface contacts the first surface and the second adhesive surface contacts the second surface, wherein when there is no temperature difference between the first prism and the second prism, an overlapping ratio between the first adhesive surface and the second adhesive surface is P1, wherein when there is a temperature difference between the first prism and the second prism, the overlapping ratio between the first adhesive surface and the second adhesive surface is P2, wherein P2 is greater than P1.

* * * * *